United States Patent
Neff et al.

[15] 3,705,405
[45] Dec. 5, 1972

[54] AIRCRAFT PROXIMITY DEVICE

[72] Inventors: Ray A. Neff, Marshall, Ill.; Dan D. Gowings, Terre Haute, Ind.

[73] Assignee: Visu-Phonics, Incorporated, Terre Haute, Ind.

[22] Filed: March 2, 1970

[21] Appl. No.: 15,560

[52] U.S. Cl. .................343/112 CA, 343/112 S
[51] Int. Cl. ..................................G08g 3/02
[58] Field of Search ...................343/112 CA

[56] References Cited

UNITED STATES PATENTS

| | | | |
|---|---|---|---|
| 2,568,568 | 9/1951 | Stansbury | 343/112 CA UX |
| 2,498,933 | 2/1950 | Wallace | 343/112 CA UX |

Primary Examiner—Benjamin A. Borchelt
Assistant Examiner—Richard E. Berger
Attorney—Victor J. Evans & Co.

[57] ABSTRACT

Gyro circuitry, variable oscillator circuitry, and carrier suppressor circuitry for transmitting a carrier frequency determinative of the direction of travel of an object and for suppressing transmission when its receiver is tuned to the same frequency. An air speed indicator ganged with a rheostat, a variable audio oscillator, and a modulator for transmitting an audio tone determinative of the speed of the object. A receiver, a scanner, and tuning circuitry for converting the audio signal received from a traveling object into a visual indication of the direction in which that object is traveling.

4 Claims, 3 Drawing Figures

INVENTORS.
RAY A. NEFF
DAN D. GOWINGS

AIRCRAFT PROXIMITY DEVICE

This invention relates to a device which is carried by an aircraft, ship, vehicle, or any other type of traveling objects for the determining of the direction of travel and the speed of other objects within a certain range of the device.

Most collisions and near misses between aircraft occur in marginal weather where there are craft on both instrument flight regulations (IFR) and visual flight regulations (VFR) in the same area or where forward observation is reduced. Very often one or both of the aircraft involved are traveling at speeds in excess of two hundred and fifty knots with the assumption that they are the only aircraft in that air space. This invention makes the pilot aware of other craft within a 15 to 20 mile range although he still is not sure where they are. However, once the craft are known to be within the vicinity, a direction finder or intercom may establish their location and the pilot may sight the other craft visually. This simple, low cost, and light weight device has been invented to fill the gap between no electronic equipment on a craft and sophisticated, expensive and heavy equipment on a craft such as radar systems in the hope of promoting widespread use of an electronic proximity device for all types of planes including commercial and private craft. It should be noted that this invention may also form the heart of a much more sophisticated proximity device whereby a computerized system would keep trace of all craft in the area and project their activities onto a screen or cathode ray tube.

Accordingly, a primary object of this invention is to provide a device for indicating the direction of travel and the speed of an object which is carrying the device.

Another object of this invention is to provide a device for suppressing the transmission of the direction of travel of an object when it would interfere with the reception of the direction of travel and speed of another object in the vicinity.

Still another object of this invention is to provide a device for converting an audio signal to a visual indication of heading of another object.

A further object of this invention is to provide a device for receiving a signal indicative of the direction of travel in which an object is moving.

The above and other objects of the invention will become apparent to those skilled in the art after a consideration of the following detail description of the preferred embodiments of this invention taken together with the accompanying drawings in which.

Figure 1:
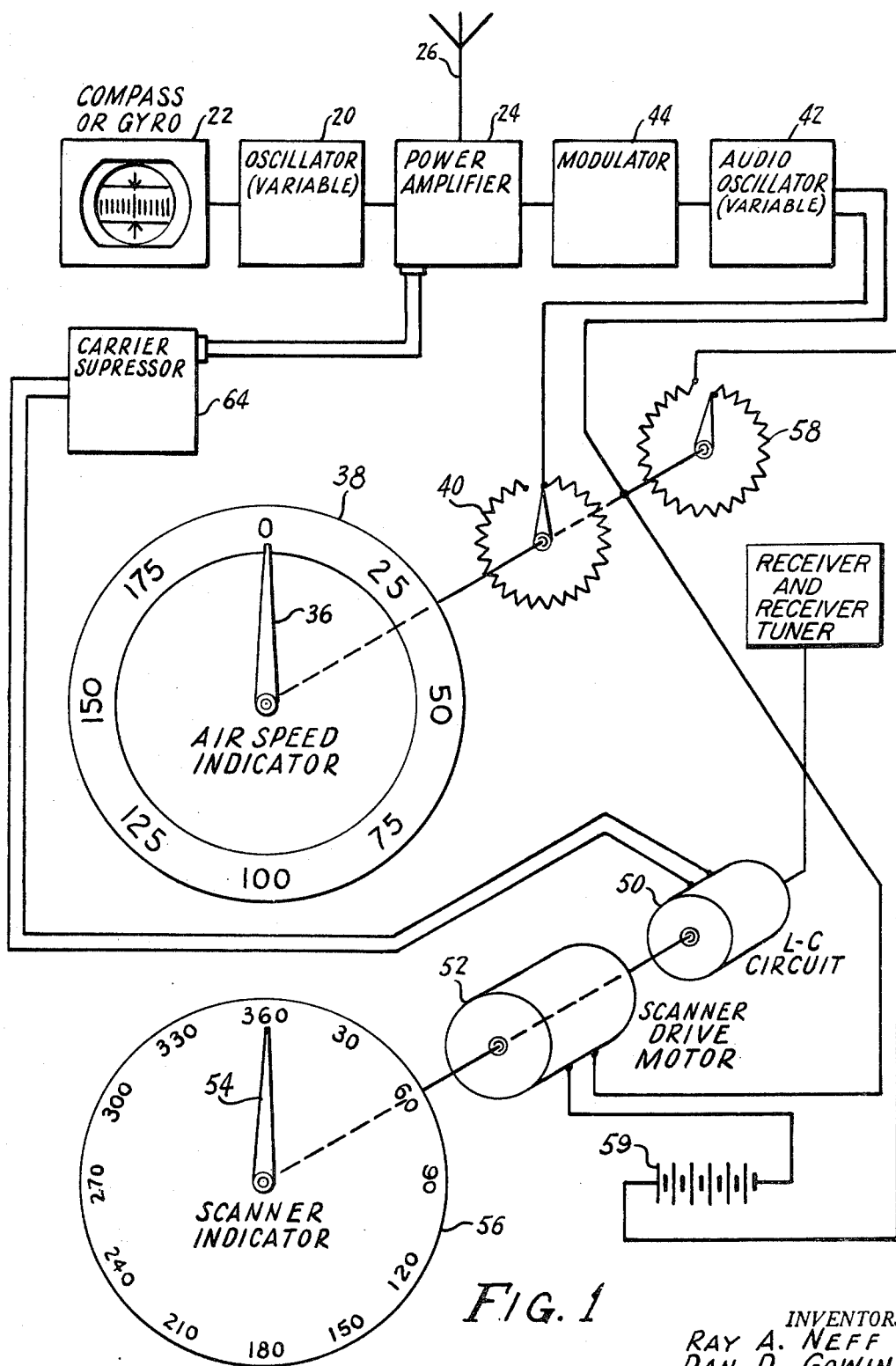
FIG. 1 is a block diagram of the proximity device.

Referring to the drawing in greater detail, there is shown in FIG. 1 a radio transmitter having a variable frequency oscillator 20. Oscillator 20 provides a carrier signal having a frequency which is automatically determined by a compass or a gyro 22. The signal is amplified by a power amplifier 24 and transmitted by means of antenna 26.

Figure 2:
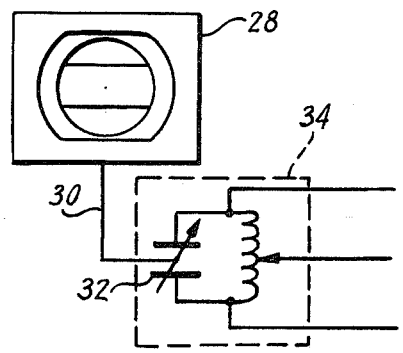
FIG. 2 is a schematic of a heading (direction of travel) to frequency converter.

FIG. 2 shows a directional device 28 such as compass or gyro 22 having automatic qualities for allowing constant adjustment of the frequency of the transmitter carrier for continuously reflecting the heading of the craft on which the transmitter is installed. Directional device 28 has a shaft 30 for changing the capacitance of a variable condenser 32 of the L-C circuit 34 of variable frequency oscillator 20.

The carrier wave transmitted by antenna 26 is modulated with a wave, the form of which is indicative of the speed of the craft. In its simplest form the wave would be a sine wave with a frequency in the audible range with the lower speeds being represented by lower tones and the higher speeds being represented by higher tones. The arm 36 of an air speed indicator 38 is ganged with a rheostat 40 for varying an audio oscillator 42 which is connected to a modulator 44.

This invention also has a receiver (not shown) which covers the frequency range of the transmitter and which is equipped with a scanning device so that the frequency range is continuously scanned in a systematic manner. The receiver is connected to an L-C circuit 50 which is in turn connected to a scanner drive motor 52 ganged with the arm 54 of a scanner indicator 56. The scanner indicator 56 is set so that as the receiver scans the frequencies, scanner indicator 56 will indicate to an observer the heading of other craft in the area when the receiver picks up their signals and converts them to audible sound. The frequency at which the signal is picked up would indicate the heading of the other craft and would be read in degrees with "360" being indicative of north. The "beep" signal picked up by the receiver will, when converted to audible sound have a certain tone which is indicative of the speed of the craft from which the signal is coming. An example of the FCC frequency allocation for transmission and reception of the carrier frequency is shown below:

| Heading | | Carrier Frequency |
|---|---|---|
| North | 360° | 150.000 MH |
| East | 90° | 150.250 MH |
| South | 180° | 150.500 MH |
| West | 270° | 150.750 MH |

The following table is exemplary of the frequency-speed conversion that would be used in the system:

| Speed | Audio Frequency |
|---|---|
| 100 MPH | 100 Cycles per second |
| 200 MPH | 600 CPS |
| 300 MPH | 1500 CPS |
| 400 MPH | 2000 CPS |
| 500 MPH | 2500 CPS |
| 600 MPH | 3000 CPS etc. |

The speed of the scan of the receiver is determined by the speed of the receiving craft by means of a rheostat 58 which is ganged with rheostat 40 and arm 36 and is connected to a power source 59 for regulating scanner drive motor 52.

The following table is exemplary of the speed-scan relationship:

| | Scanning Speeds |
|---|---|
| 60 MPH | 1 scan/minute |
| 300 MPH | 2 scans/minute |
| 600 MPH | 4 scans/minute |

Figure 3:
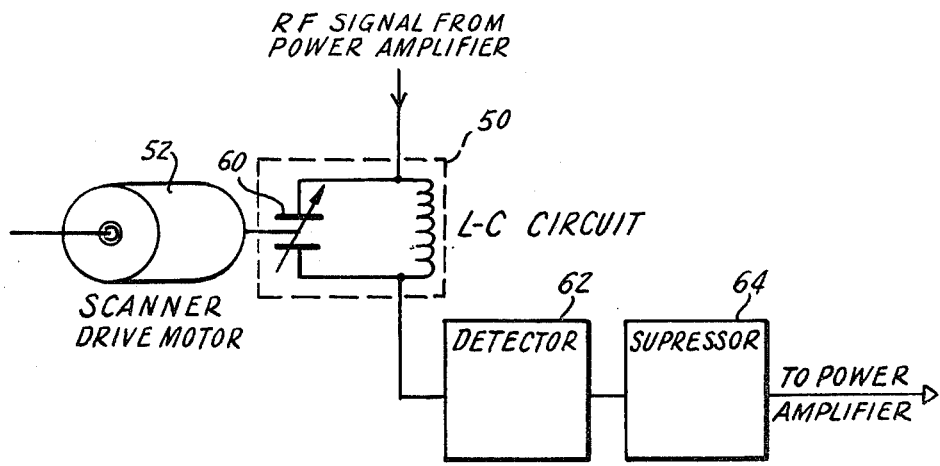
FIG. 3 is a schematic of the carrier suppressor.

FIG. 3 shows scanner drive motor 52 connected to variable condenser 60 in order to vary the capacitance of L-C circuit 50. Connected in series between L-C circuit 50 and power amplifier 24 is a detector 62 and a suppressor 64. As scanner indicator 56 tunes the receiver on the craft to the frequency being transmitted by the craft, the carrier of the transmitter on the craft will be momentarily interrupted by suppressor 64 so that the craft does not receive its own signal and possibly fail to receive the signal of another craft on the same heading. The circuit is so aligned that when the receiver is tuned to a certain frequency, L-C circuit 50 will be tuned to the same frequency. When L-C circuit 50 is tuned to the frequency of the transmitter, a voltage is induced into L-C circuit 50 and fed to suppressor 64 which operates as a "blocked-grid" keying circuit, momentarily removing the voltage from the final stage of power amplifier 24 and thereby suppressing the carrier. Suppressor 64, it should be noted, could also be applied to oscillator 20 rather than amplifier 24 in order to suppress the carrier.

When a plane takes off, the proximity device becomes active as soon as air speed indicator 38 advances enough to start scanner indicator 56 and raise the pitch of of the tone into the audible range. The unit will have been tested before take-off and there would be clearance to make sure that it is operable. As the craft begins its climb out of the airport, the transmitter would be transmitting a carrier, the frequency of which would be indicative of the heading of the aircraft, and that carrier would be modulated with a tone, the pitch of which would be indicative of its speed. This signal would be receivable by all craft and ground stations within a fifteen-twenty mile area. At the same time, the receiver would be scanning the frequency range of the system in order to determine the presence of other aircraft in the same fifteen-twenty mile area.

While the preferred embodiments of this invention have been illustrated and described, it will be understood by those skilled in the art that modifications and changes may be resorted to without departing from the spirit and scope of the invention.

I claim:

1. A communications system, comprising:
   first means including an antenna for transmitting a carrier frequency indicative of the heading of a craft in which the communications system is installed;
   second means connected to said first means for modulating the transmitter carrier frequency with an audio frequency indicative of the speed of the craft;
   third means connected to said second means for receiving and scanning a modulated carrier frequency from another craft and for converting the carrier frequency received into a visual indication of the heading of said other craft, said third means having a regulatable frequency scanning speed, said second means regulating the frequency scanning speed of said third means; and
   fourth means connected between said first means and said third means for preventing said third means for receiving the signal transmitted by said first means.

2. The communications system of claim 1, wherein said second means comprises an air speed indicator ganged with a rheostat, a variable audio oscillator controlled by said rheostat, a modulator, and a power amplifier, said second means including a second rheostat ganged with said first rheostat and said air speed indicator and connected to said third means for regulating the scan frequency speed.

3. The communications system of claim 2, wherein said third means comprises a receiver having a variable tuning circuit, a variable L-C circuit, a motor, and a scanner indicator ganged together, said motor also being connected to said second rheostat for regulating the speed of the motor.

4. The communications system of claim 3, wherein said fourth means comprises a detector and a suppressor in series between said power amplifier and said L-C circuit for preventing transmission from said antenna during the period of time said receiver is tuned to the carrier frequency indicative of the direction of travel of the craft having said antenna in order to receive the carrier frequency signal of said other craft when said other craft is traveling in the same direction as the craft having said antenna.

* * * * *